United States Patent [19]

Phelon

[11] 4,153,045
[45] May 8, 1979

[54] COOKING UTENSIL

[75] Inventor: Russell E. Phelon, Rio Piedras, P.R.

[73] Assignee: Phelon Magnagrip Co. Inc., East Longmeadow, Mass.

[21] Appl. No.: 858,434

[22] Filed: Dec. 7, 1977

[51] Int. Cl.² ............................................. A47J 27/58
[52] U.S. Cl. ............................................. 126/384
[58] Field of Search ............ 126/384, 383, 348, 369, 126/367; 99/449, 357, 444, 450; 220/218, 85 CH, 85 D, 85 E

[56] References Cited

U.S. PATENT DOCUMENTS

| | | | |
|---|---|---|---|
| 1,356,432 | 10/1920 | Eidt | 99/450 |
| 2,040,004 | 5/1936 | Kelsay | 126/369 X |
| 2,262,538 | 11/1941 | Olson et al. | 126/383 X |
| 2,541,094 | 2/1951 | Pesenti | 126/384 X |
| 3,487,974 | 4/1968 | Schovee | 220/212 X |
| 3,794,016 | 2/1974 | Binks et al. | 126/369 |

FOREIGN PATENT DOCUMENTS

| | | | |
|---|---|---|---|
| 434783 | 10/1911 | France | 126/248 |
| 20030 of | 1910 | United Kingdom | 126/384 |

*Primary Examiner*—Samuel Scott
*Assistant Examiner*—Randall L. Green
*Attorney, Agent, or Firm*—Chapin, Neal & Dempsey

[57] ABSTRACT

A cooking utensil in the form of a pan having upstanding walls and a lid or cover supportable by the upper edges of the walls and which is dimensioned to fit into the interior of the pan for use as a food scoop or spatula. In its preferred embodiment, the cover is generally planar and perforated enabling its use as a sieve for the draining of cooking fluids from food supported thereon and as a porous cover which promotes condensation of cooking vapors for basting the food being cooked in the pan.

10 Claims, 7 Drawing Figures

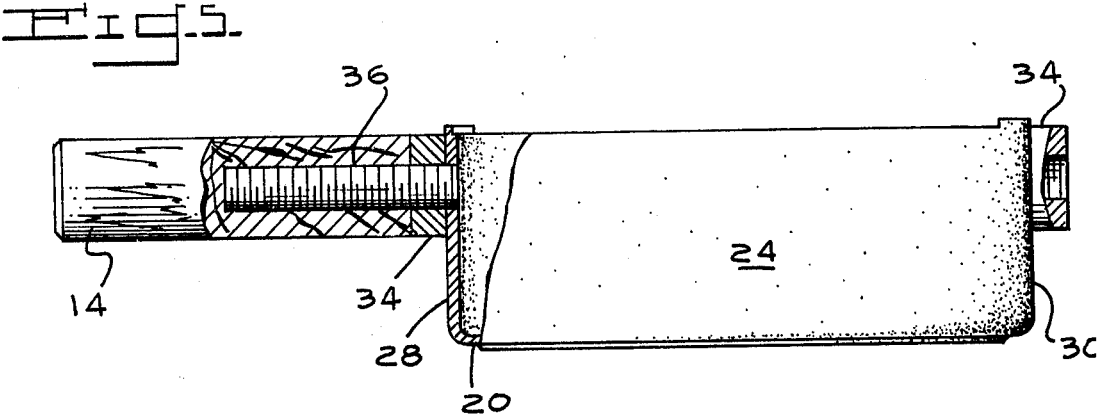
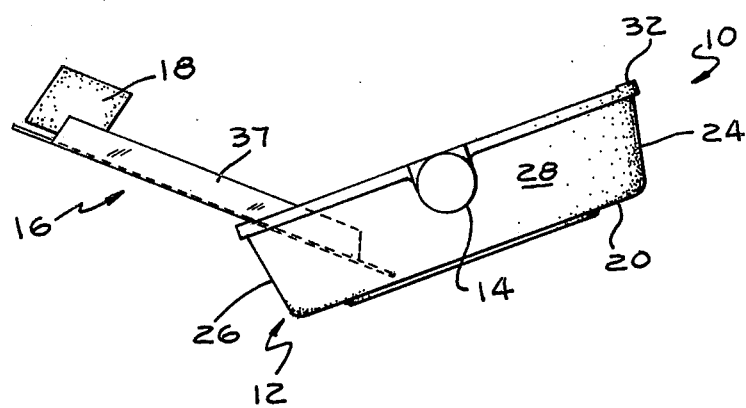
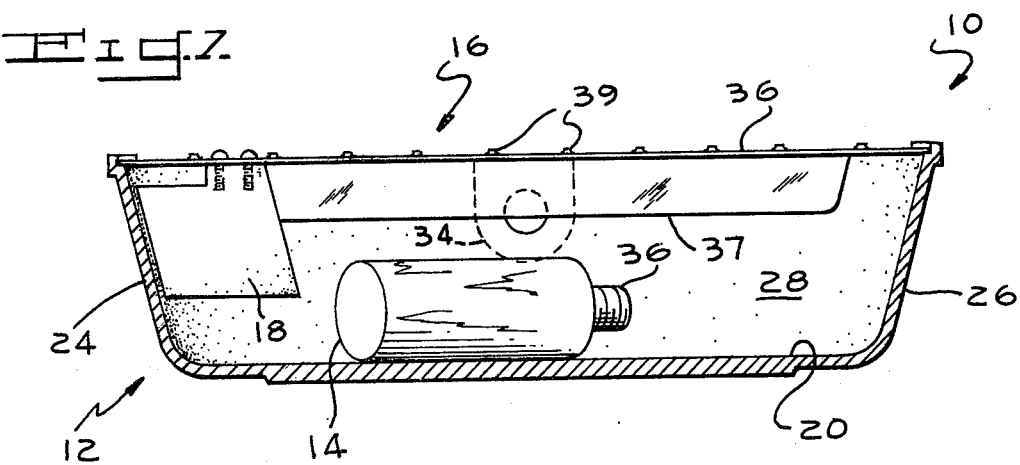

COOKING UTENSIL

BACKGROUND

The invention relates to a cooking utensil and more particularly the combination of a cooking utensil nd a multi-functional cover which serves as a cover, spatula and strainer for selectively basting, tending or draining foods being cooked in the utensil.

In food preparation, it is customary to perform various cooking and manipulative steps with a variety of different implements or utensils. Thus, at various times during cooking one finds the need for pan covers for stewing, strainers for draining, spatulas for turning the food to promote uniform cooking, and spoons for basting or serving. Of course, it will be recognized that such a variety of cooking utensils is both costly and bulky, and therefore, unsuitable and inconvenient for use on recreational activities, such as camping and boating.

Accordingly, it is an object of the present invention to provide a highly versatile cooking utensil adapted for a wide variety of culinary processes.

It is a further object of the present invention to provide a cooking utensil of the above type which is compact in size and light in weight and which is equipped with a multi-purpose lid.

These and other objects will become more readily apparent from the following detailed description taken in connection with the accompanying drawings, in which:

FIG. 5 is a side elevational view of the cooking utensil partly in section;

FIG. 6 is a side view of the cooking utensil showing its cover being used as a spatula; and FIG. 7 is an end elevational view of the cooking utensil partly in section showing its cover disposed in another position.

DETAILED DESCRIPTION

Figure 1:
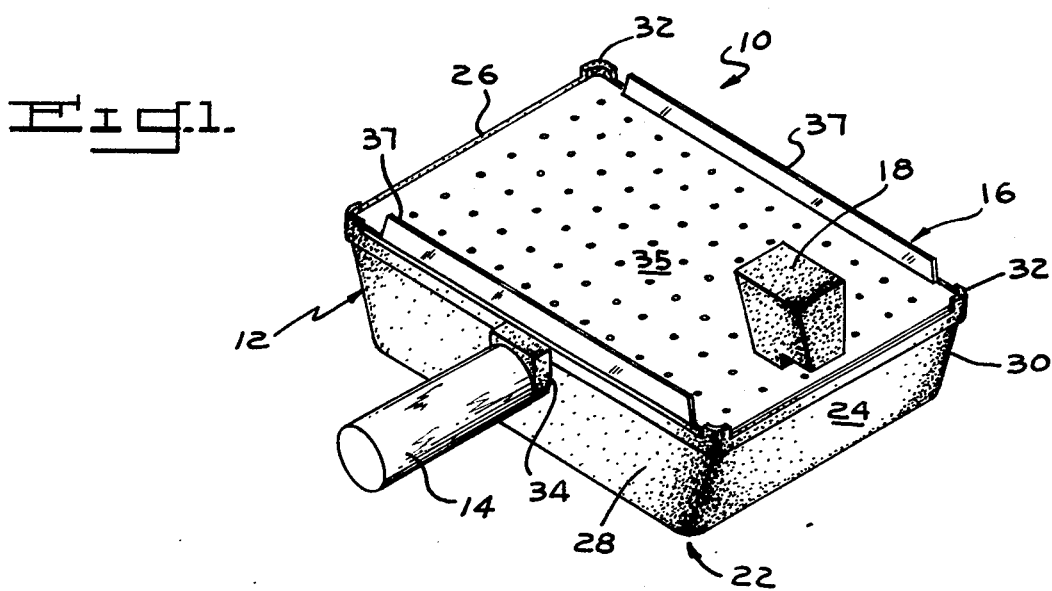
FIG. 1 is a perspective view of the cooking utensil of the present invention.

Referring to the drawings, the cooking utensil of the present invention is shown generally at 10 and comprises a pan or vessel 12 with handle 14 and a separate lid or cover 16 having a handle 18.

Figure 2:
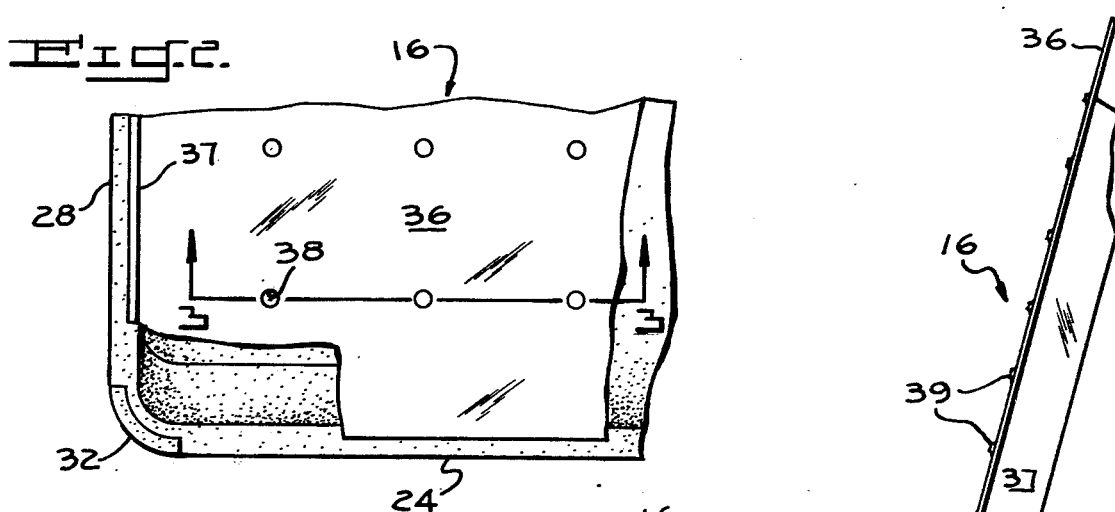
FIG. 2 is an enlarged fragmentary top plan view of the cooking utensil as shown in FIG. 1.
Figure 4:
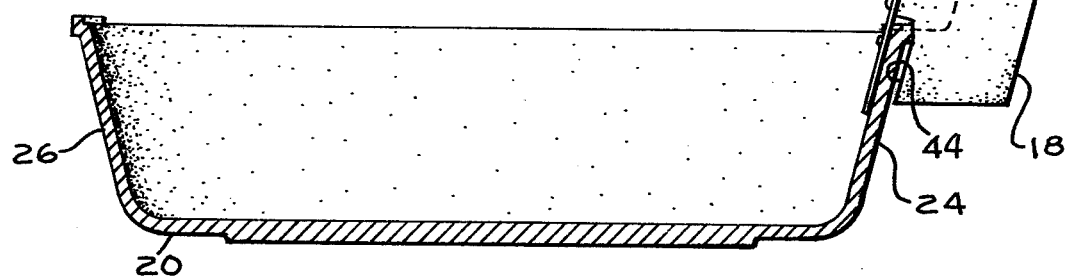
FIG. 4 is a side elevational view partly in section of the cooking utensil with its cover disposed in a different position than shown in FIG. 1.

Pan 12 includes a generally rectangular bottom 20 and upstanding wall structure 22 including side walls 24 and 26 and front and rear walls 28 and 30. The wall structure is of a height sufficient to enable the pan to be used for deep fat frying as well as grilling, braising and boiling of foods. Pan 12 may be formed from any conventional heat resistant cooking vessel material, such as cast iron, stainless steel and the like. In the preferred embodiment, the pan is formed from cast aluminum for the even transfer of heat therethrough and the minimization of weight which renders utensil 10 ideally suited for camping, boating and other outdoor activities where compact size and ease of portability are highly desirable. The side walls 24 and 26 are inclined outwardly from the pan bottom, as shown in FIG. 4, to facilitate the use of cover 16 as a spatula, as will hereinafter be described in more detail. The other walls 28 and 30 are generally vertical or perpendicular to the bottom of the pan. As best seen in FIGS. 1 and 2, corner beads or moldings 32 extend upwardly of the wall structure for retaining the cover 16 in registered relation with the upper edges of the wall structure. At least one, and preferably both walls 28 and 30 are provided with an internally threaded adaptor or block 34 to which handle 14, having an externally threaded stud 36, may be removably secured for either right or left-handed manipulation of utensil 10. The handle 14 may be formed from any suitable heat resistant material, such as wood or plastic. If desirable, when the utensil is not in use, the handle 14 may be removed from the pan and stored inside as illustrated in FIG. 7. The removability of the handle facilitates storage of the utensil in areas of limited space, such as in galleys of recreational vehicles and boats.

Cover 16 which may be fabricated of any suitable heat resistant sheet material includes a generally planar portion 35 and upwardly extending flanges 37 along its side edges to keep food from dropping off the sides of the cover when being used as a spatula or sieve. The flanges 37, which impart enhanced structural rigidity to the cover, terminate short of the ends of the planar portion 36 so as not to interfere with the corner being fitted into the pan as shown in FIG. 7. The length of the cover is such that the front and rear edges are supportable by the upper edge portions of walls 24 and 26 and its corners are maintained in registry therewith by corner beads 28 as previously described. The cover 16 also includes a handle 18 formed of any suitable material and mounted on the upper surface of the planar panel adjacent one end thereof so as not to interfere with food supported on the cover. The undersurface of the handle includes an undercut slot 44 (FIG. 4) adapted to fit onto the upper edge of the pan while not in use for draining cooking fluids into the pan. The handle 18 is wholly disposed within the perimeter of the cover and is of a height less than the depth of the pan so that the cover may be inverted and compactly stored as shown in FIG. 7. The width of the cover 16 is substantially less than the spacing between the inner surfaces of vertical walls 28 and 30 so that the cover can be inserted into the pan between the vertical walls for use as a spatula (FIG. 6). The slope of side walls 24 and 26 facilitates the use of the cover in this manner as a spatula or scoop whereby it may be manipulated into the pan by grasping cover handle 18 with one hand and sliding its leading edge downwardly against one of the inclined walls and then across the bottom of the pan while grasping the pan handle 14 with the other hand for holding or tilting the pan as desired to assist in this food scooping or turning operation. As shown in FIG. 6, the pan may be readily tilted about the longitudinal axis of handle 14 while the cover is moved transversely thereto across the bottom of the pan. This pan construction is thus readily adaptable for use by people of varying dexterity. Thus, the pan may be held, moved and tilted with either hand while the scoop lid may be manipulated using the free hand.

Figure 3:
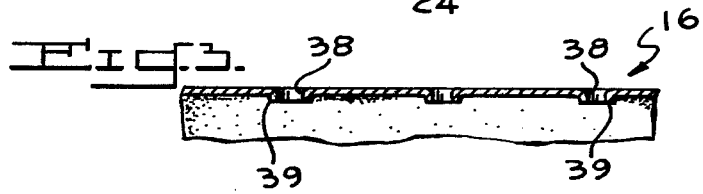
FIG. 3 is a sectional view taken along line 3—3 of FIG. 2.

As best seen in FIGS. 2 and 3, the cover includes a plurality of perforations or holes 38, the perimeter of each being defined by a raised rim 39, which is formed when the holes are punched in the planar portion of the lid. Perforations 38 provide a means by which cooking fluids may be vented while cooking and then drained from food scooped onto the perforated surface of the cover. In such a draining operation the cover can either be held by its handle 18 or placed onto the top of the pan, as shown in FIG. 1. In addition, the perforated cover is ideally suited for basting foods being cooked in the pan with the cover in place. The perforations permit the escape of some cooking vapor while the downwardly extending aperture rims 38 (FIG. 3) substantially increase the surface area of the undersurface of cover 16 so that sufficient cooking vapors will condense on the undersurface of the cover and drop into the pan for basting the food cooking therein.

When not being used the utensil may be stored as shown in FIG. 7 with the planar surface of the cover flush with the upper edge of the pan. Handle 14 may be unscrewed from its mounting block 34 and stored inside the pan. In this manner the utensil is most compact and has no external projections, thus being ideally suited for storage in limited spaces such as found in recreational vehicles and boats.

Having thus described the invention, what is claimed is:

1. Cooking utensil comprising an upwardly opening polygonal shaped pan having a bottom and an upstanding wall structure and a separate cover adapted to span substantially the area defined by the upper edge portions of said wall structure, said cover being supportable at two opposed edge portions by said wall structure, one dimension of said cover being substantially less than the corresponding dimension of the pan so that the cover when tilted relative thereto is adapted to engage the bottom of said pan in surface-to-surface contact for use as a spatula.

2. Cooking utensil of claim 1 wherein said pan and cover are of generally rectangular configuration.

3. Cooking utensil of claim 2 wherein the width of said cover from side edge to side edge thereof is substantially less than the width of said pan, said cover including upstanding flanges disposed along portions of said side edges providing food retaining walls when the cover is used as a spatula or strainer.

4. Cooking utensil of claim 3 wherein said cover includes a panel of generally planar configuration which is perforated, said perforations allowing for the venting and drainage of cooking vapors through said planar panel when the cover is used as a pan lid or strainer.

5. Cooking utensil of claim 4 wherein said perforations are uniformly distributed over said planar panel and each is defined by a circumferential rim projecting from the undersurface thereof, said rims providing increased surface area on the underside of said planar panel for limiting the escape of cooking vapors through said perforations thereby promoting condensation of said vapors for redeposit into the pan for basting the food being cooked in said pan.

6. Cooking utensil of claim 5 wherein two opposed walls of said pan are generally vertical and two slope outwardly from the bottom at an obtuse angle for guiding the leading edge of said cover into surface-to-surface engagement with said bottom when said cover is used as a spatula.

7. Cooking utensil of claim 6 and in which said pan includes a handle removably extending outwardly of each of said vertical walls, the spacing between said vertical walls being substantially greater then the width of said cover and the dimension between the upper edges of said sloping walls being less than the length of said cover.

8. The cooking utensil of claim 7 wherein said cover is provided with a handle which extends from the upper surface of said planar panel and is disposed inwardly of the perimeter of said panel, said cover handle including an undercut slot adapted to fit onto an upper edge portion of said wall structure for supporting said cover in upright generally parallel relation thereto whereby cooking fluids will drain from said cover into the pan.

9. Cooking utensil of claim 7 wherein the height of the cover handle is not greater than the depth of said pan thereby allowing said cover to be inverted and supported on top of said pan for storage, said flanges on the side edges of said cover terminating short of the outer edges of said planar panel.

10. Cooking utensil as set forth in claim 9 in which the rear surface of said cover handle is inclined oppositely to the inclination of the sloping walls whereby in said inverted position the rear surface is disposed in proximate parallel relation to the adjacent pan wall for retaining the cover in fixed stored relation on said pan, and corner beads extending upwardly form the corners of said wall structure for maintaining said cover in registered edge-to-edge relation on the top of said pan.

* * * * *